(12) United States Patent
Ozharar et al.

(10) Patent No.: US 12,516,976 B2
(45) Date of Patent: Jan. 6, 2026

(54) OUTDOOR APPLICATION OF DISTRIBUTED FIBER OPTIC SENSING / ACOUSTIC SENSING

(71) Applicant: NEC Laboratories America, Inc., Princeton, NJ (US)

(72) Inventors: Sarper Ozharar, Pennington, NJ (US); Ting Wang, West Windsor, NJ (US); Yue Tian, Princeton, NJ (US); Yangmin Ding, East Brunswick, NJ (US); Philip Ji, Cranbury, NJ (US); Shaobo Han, Princeton, NJ (US); Ming-Fang Huang, Princeton, NJ (US); Tingfeng Li, Plainsboro, NJ (US)

(73) Assignee: NEC Corportation, Tokyo (JP)

( * ) Notice: Subject to any disclaimer, the term of this patent is extended or adjusted under 35 U.S.C. 154(b) by 281 days.

(21) Appl. No.: 17/958,415

(22) Filed: Oct. 2, 2022

(65) Prior Publication Data

US 2023/0130788 A1     Apr. 27, 2023

Related U.S. Application Data

(60) Provisional application No. 63/313,028, filed on Feb. 23, 2022, provisional application No. 63/311,523, filed on Feb. 18, 2022, provisional application No. 63/270,651, filed on Oct. 22, 2021.

(51) Int. Cl.
*G01H 9/00*     (2006.01)
*G01D 5/353*    (2006.01)
*H04B 10/071*   (2013.01)

(52) U.S. Cl.
CPC ......... *G01H 9/006* (2013.01); *G01D 5/35364* (2013.01); *H04B 10/071* (2013.01)

(58) Field of Classification Search
CPC ... G01H 9/006; G01D 5/35364; H04B 10/071
USPC .......................................................... 385/12
See application file for complete search history.

(56) References Cited

FOREIGN PATENT DOCUMENTS

| CA | 3036133 A1 | * | 3/2018 | ............. G01H 9/004 |
| CN | 110493998 A | * | 11/2019 | ........... H05K 5/0213 |

OTHER PUBLICATIONS

Translation of CN-110493998 (Year: 2019).*

* cited by examiner

*Primary Examiner* — Jerry M Blevins
(74) *Attorney, Agent, or Firm* — Vincent Duffy; Joseph Kolodka

(57) ABSTRACT

Aspects of the present disclosure describe distributed fiber optic sensing (DFOS) systems, methods, and structures that advantageously sense/monitor outdoor facilities and structures including outdoor cabinets containing fiber optic facilities in which the cabinet/fiber optic cable contained therein are configured to provide superior acoustic sensing. Further outdoor facilities and structures that are monitored include manhole structures. Superior DFOS/DAS monitoring results are obtained by employing a machine learning-based analysis method that employs a temporal relation network (TRN).

11 Claims, 20 Drawing Sheets

| Act. | A | B | C | D | E | F | G | H | I | J |
|---|---|---|---|---|---|---|---|---|---|---|
| | Jiggle Lid | Open Lid | Close Lid | Tap Lid | Tap Case | Tap Wall | Pull out Case | Put back Case | Handle Case | Shake Cable |

FIG. 7

OUTDOOR APPLICATION OF DISTRIBUTED FIBER OPTIC SENSING / ACOUSTIC SENSING

CROSS REFERENCE

This application claims the benefit of U.S. Provisional Patent Application Ser. No. 63/270,651 filed 2 Oct. 2021, U.S. Provisional Patent Application Ser. No. 63/311,523 filed 18 Feb. 2022, and U.S. Provisional Patent Application Ser. No. 63/313,028 filed 23 Feb. 2022 the entire contents of each being incorporated by reference as if set forth at length herein.

TECHNICAL FIELD

This disclosure relates generally to distributed fiber optic sensing (DFOS) systems, methods, and structures and outdoor applications thereof that may advantageously include temporal relation network methodologies that provide superior sensing.

BACKGROUND

Recently, DFOS systems and methods have been employed to provide superior acoustic and/or vibrational monitoring of roadways, bridges, and buildings. The reliability, robustness, and sensitivity of such systems is generally known to be unmatched by existing, legacy systems and methods. Given such characteristics, further application of DFOS to outdoor facilities—including telecommunications facilities—coupled with novel analysis systems and methods would represent a welcome addition to the art.

SUMMARY

An advance in the art is made according to aspects of the present disclosure directed to DFOS systems, methods, and structures that are particularly advantageous for outdoor applications including telecommunications facility monitoring.

Viewed from a first aspect, the present disclosure describes DFOS systems, methods, and structures for monitoring outdoor cabinets containing fiber optic facilities in which the cabinet/fiber optic cable contained therein are configured to provide superior acoustic sensing.

Viewed from a second aspect, the present disclosure describes DFOS systems, methods, and structures for monitoring manhole structures.

Finally, viewed from yet another aspect, the present disclosure describes DFOS systems, methods, and structures employing a machine learning-based analysis method that employs a temporal relation network.

BRIEF DESCRIPTION OF THE DRAWING

A more complete understanding of the present disclosure may be realized by reference to the accompanying drawing in which:

FIG. 7 shows illustrative activities related to a manhole including those related to the lid/cover, i.e., simulated opening of the lid, closing the lid, lid tapping, case tapping, and pulling cable activities that are used to train our AI models according to aspects of the present disclosure;

DESCRIPTION

Figure 1A:
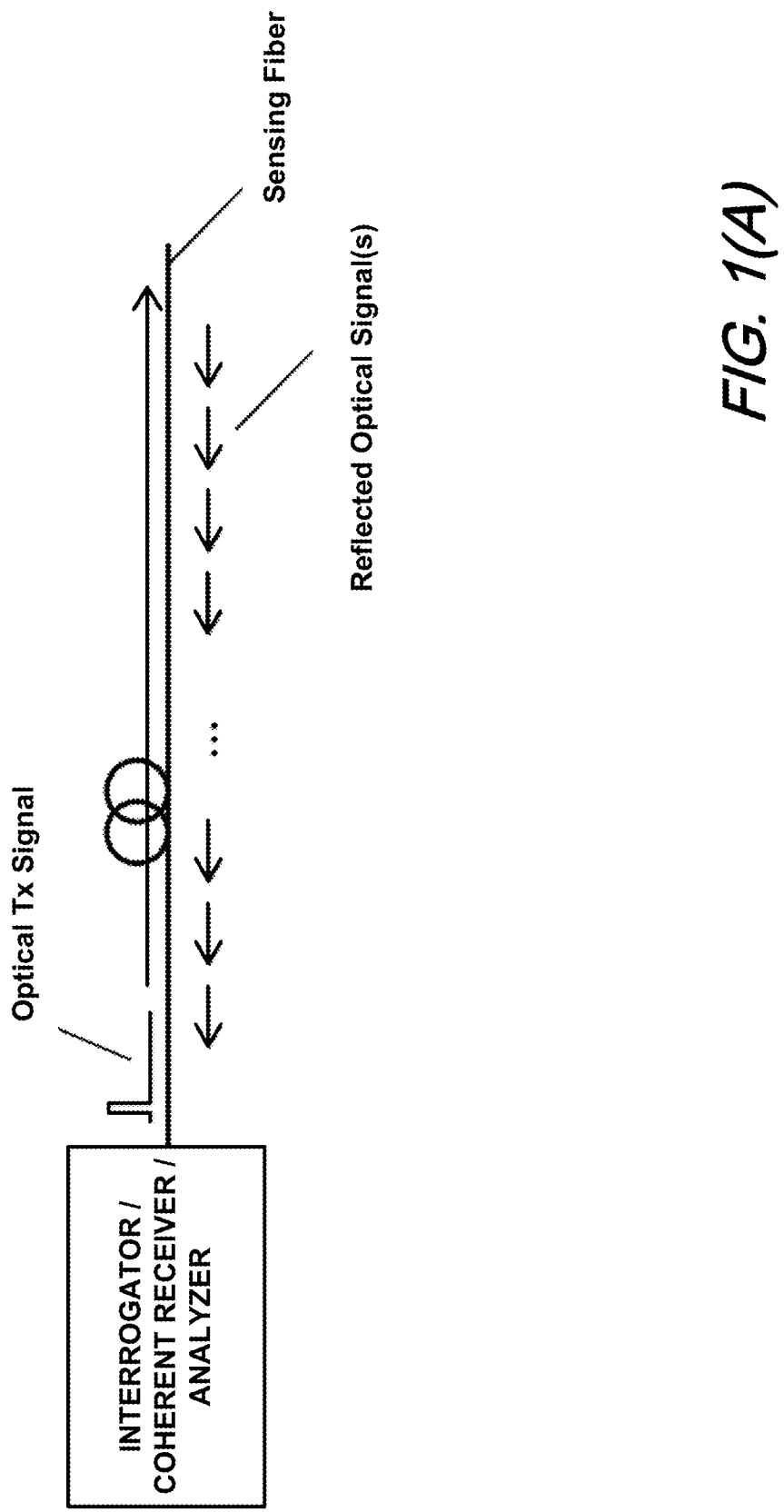
FIG. 1(A) is a schematic diagram illustrating a DFOS system according to aspects of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we begin by noting that distributed fiber optic sensing (DFOS) is an important and widely used technology to detect environmental conditions (such as temperature, vibration, acoustic excitation vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. DFOS can also employ a signal of forward direction that uses speed differences of multiple modes. Without losing generality, the following description assumes reflected signal though the same approaches can be applied to forwarded signal as well.

FIG. 1(A) is a schematic diagram of a generalized, prior-art DFOS system. As will be appreciated, a contemporary DFOS system includes an interrogator that periodically generates optical pulses (or any coded signal) and injects them into an optical fiber. The injected optical pulse signal is conveyed along the optical fiber.

Figure 1B:
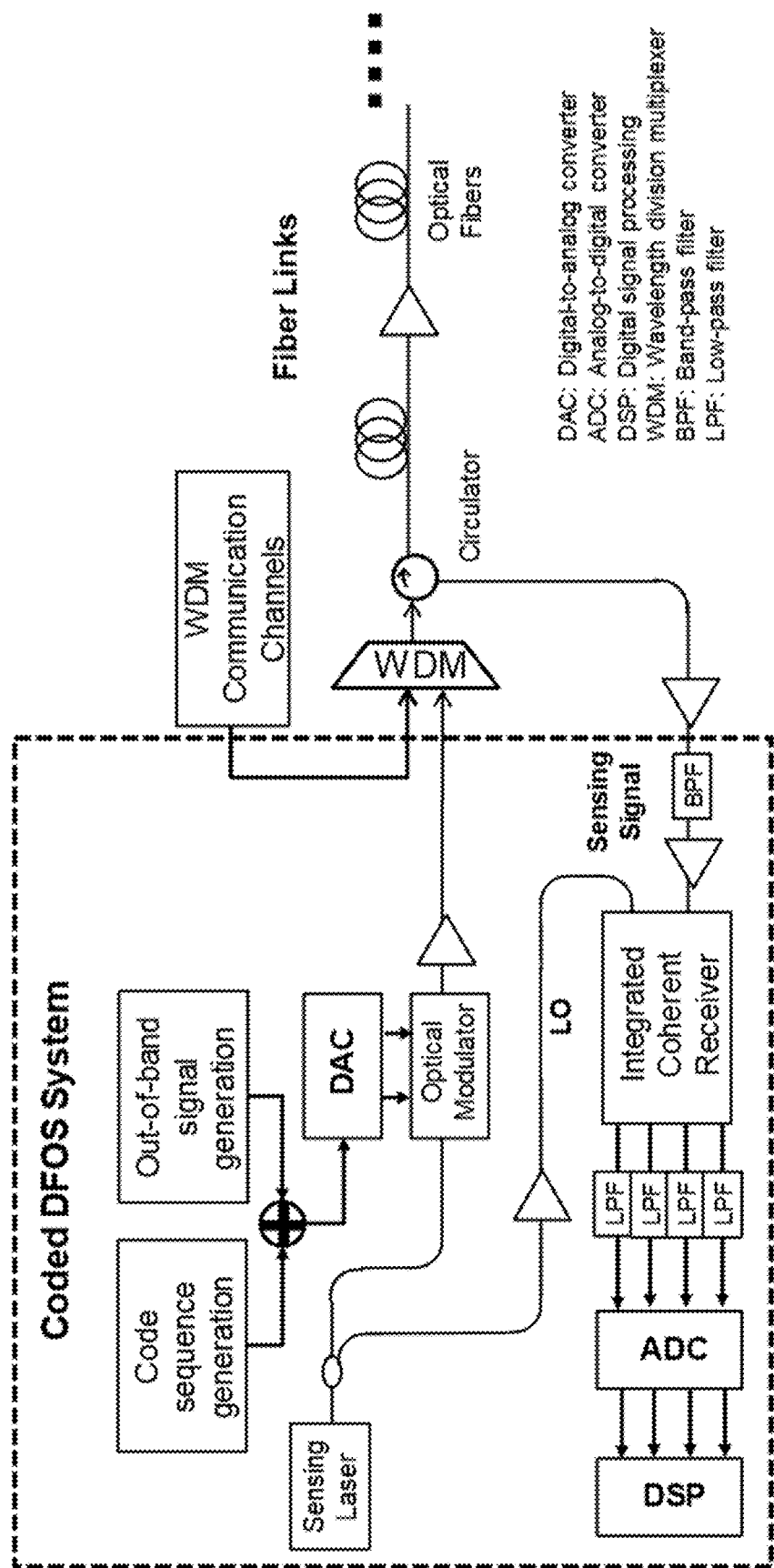
FIG. 1(B) is a schematic diagram illustrating a coded constant-amplitude DFOS system with out-of-band signal generation according to aspects of the present disclosure.

At locations along the length of the fiber, a small portion of signal is reflected and conveyed back to the interrogator. The reflected signal carries information the interrogator uses to detect, such as a power level change that indicates—for example—a mechanical vibration. While not shown in detail, the interrogator may include a coded DFOS system that may employ a coherent receiver arrangement known in the art such as that illustrated in FIG. 1(B).

The reflected signal is converted to electrical domain and processed inside the interrogator. Based on the pulse injection time and the time signal is detected, the interrogator determines at which location along the fiber the signal is coming from, thus able to sense the activity of each location along the fiber.

Those skilled in the art will understand and appreciate that by implementing a signal coding on the interrogation signal enables the sending of more optical power into the fiber which can advantageously improve signal-to-noise ratio (SNR) of Rayleigh-scattering based system (e.g. distributed acoustic sensing or DAS) and Brillouin-scattering based system (e.g. Brillouin optical time domain reflectometry or BOTDR).

As currently implemented in many contemporary implementations, dedicated fibers are assigned to DFOS systems in fiber-optic cables—physically separated from existing optical communication signals which are conveyed in different fiber(s). However, given the explosively growing bandwidth demands, it is becoming much more difficult to economically operate and maintain optical fibers for DFOS operations only. Consequently, there exists an increasing interest to integrate communications systems and sensing systems on a common fiber that may be part of a larger, multi-fiber cable.

Operationally, we assume that the DFOS system will be Rayleigh-scattering based system (e.g., distributed acoustic sensing or DAS) and Brillouin-scattering based system (e.g., Brillouin optical time domain reflectometry or BOTDR) with a coding implementation. With such coding designs, these systems will be most likely be integrated with fiber communication systems due to their lower power operation and will also be more affected by the optical amplifier response time.

In the arrangement illustratively shown in the block diagram, we assume that the coded interrogation sequence is generated digitally and modulated onto the sensing laser via digital-to-analog-conversion (DAC) and an optical modulator. The modulated interrogation sequence may be amplified to optimal operation power before being directed into the fiber for interrogation.

Advantageously, the DFOS operation may also be integrated together with communication channels via WDM in the same fiber. Inside the sensing fiber, the interrogation sequence and the returned sensing signal may be optically amplified—either via discrete (EDFA/SOA) or distributed (Raman) methods. A returned sensing signal is routed to a coherent receiver after amplification and optical band-pass filtering. The coherent receiver detects the optical fields in both polarizations of the signal, down-converting them to 4 baseband lanes for analog-to-digital conversion (ADC) sampling and digital signal processor (DSP) processing. As those skilled in the art will readily understand and appreciate, the decoding operation is done in the DSP to generate the interrogated Rayleigh or Brillouin response of the fiber, and any changes in the response are then identified and interpreted for sensor readouts.

With continued reference to the figure, since the coded interrogation sequence is generated digitally, the out-of-band signal is also generated digitally, and then combined with the code sequence before waveforms are created by the DAC. When generated together digitally, the out-of-band signal will only be generated outside the time period of the code sequence, so when added together, the combined waveform will have a constant amplitude.

As those skilled in the art will understand and appreciate, DFOS/DAS systems have been shown to detect, record and listen to acoustic vibrations in the audible frequency range. However, one of the limiting factors for sensitivity is the physical layout of the fiber optic cable used as the sensor.

For outdoor applications, telecom grade thick fiber cables are not physically very responsive to low amplitude, vibrations in the audible range. Consequently, acoustic signal quality greatly depends on the fiber type, layout and how the acoustic pressure waves are coupled to the fiber cable.

To improve the acoustic signal quality, the prior art has utilized a wrapped fiber cable with no or a very thin jacket. However, such configurations are very fragile, relatively bulky and not sufficiently resistant to outdoor, environmental conditions they are likely to encounter.

To overcome this deficiency in the art, we disclose systems, methods, and structures that transform outdoor fiber cabinets (such as an Optical Cross Connect (OCC) Cabinet) into a fiber optic microphone which advantageously enhances a DAS system.

As those skilled in the art will understand and appreciate, such outdoor fiber cabinets having an integrated fiber microphone can be used to monitor external (out of the cabinet) or internal (inside the cabinet) acoustic events, such as traffic noise, construction noise, rain, wind, technician speech, cabinet intrusions, as well as operation of electronic or mechanical devices located inside the cabinets. As a result, our inventive structures and methods can monitor the status of an outdoor fiber cabinet such as authorized or unauthorized open/close events, timings, and repairs.

The outdoor fiber cabinets (a sample picture is shown below), usually have a large metallic door. This large door surface results in a large interaction area with acoustic waves and absorbs these vibrations. In our invention, an approximately 10 meter long fiber patch is mounted to this large area cabinet door, if possible additional fiber can be mounted on the side panels as well.

Figure 2:
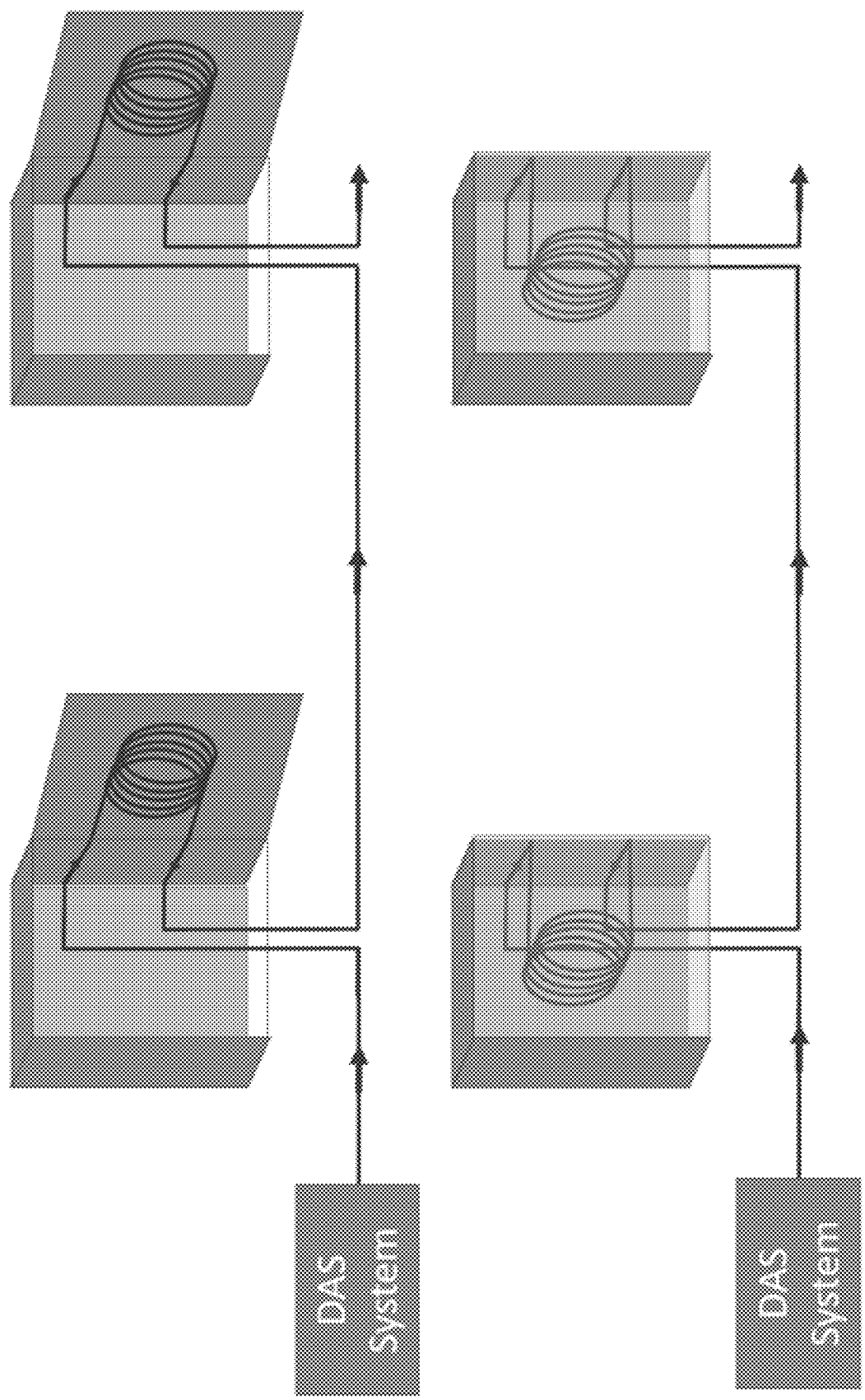
FIG. 2 is a schematic diagram illustrating a outdoor fiber optic cabinet including optical sensing fiber that advantageously may detect open and closed door conditions and other internal and external environmental conditions according to aspects of the present disclosure.

FIG. 2 is a schematic diagram illustrating a outdoor fiber optic cabinet including optical sensing fiber that advantageously may detect open and closed door conditions and other internal and external environmental conditions according to aspects of the present disclosure.

As illustrated in that figure, shown therein is a DAS sensing system, an outdoor fiber cabinet including a dedicated fiber mounted on the cabinet door in a spool-like fashion. As further illustrated in the figure, a field configuration may include multiple cabinets on a single fiber route, each individual one of the multiple cabinets connected in series along the same optical sensing fiber.

While not specifically shown in this figure, the DFOS/DAS system will process interrogator signals and be responsive returned signals which—according to aspects of the present disclosure—will exhibit an increase in signal quality, since the fiber cabinet will act as an acoustic filter due to its non-uniform frequency response. When so configured in an optical fiber cabinet, the mounting of the fiber optic cable should be done in such a way that it will not prevent the opening of the cabinet door As those skilled in the art will understand and appreciate, our inventive cabinet/fiber optic cable structures exploit the mechanical properties of the large surface area of a cabinet door and use it to improve acoustic coupling of acoustic vibrations into the fiber cable, hence increasing the signal quality. In other words, the cabinet's large surface is used as a mechanical amplifier/coupler to increase the received signal with the fiber cable. Advantageously, such amplification is purely mechanical and does not require any external power source. Finally, and as we shall show and describe in detail later in this disclosure, using additional signal processing and analysis structures and techniques, frequency responses of the cabinet structure may be corrected by acoustic calibration and other methods to further improve the received signal quality.

Figure 3:
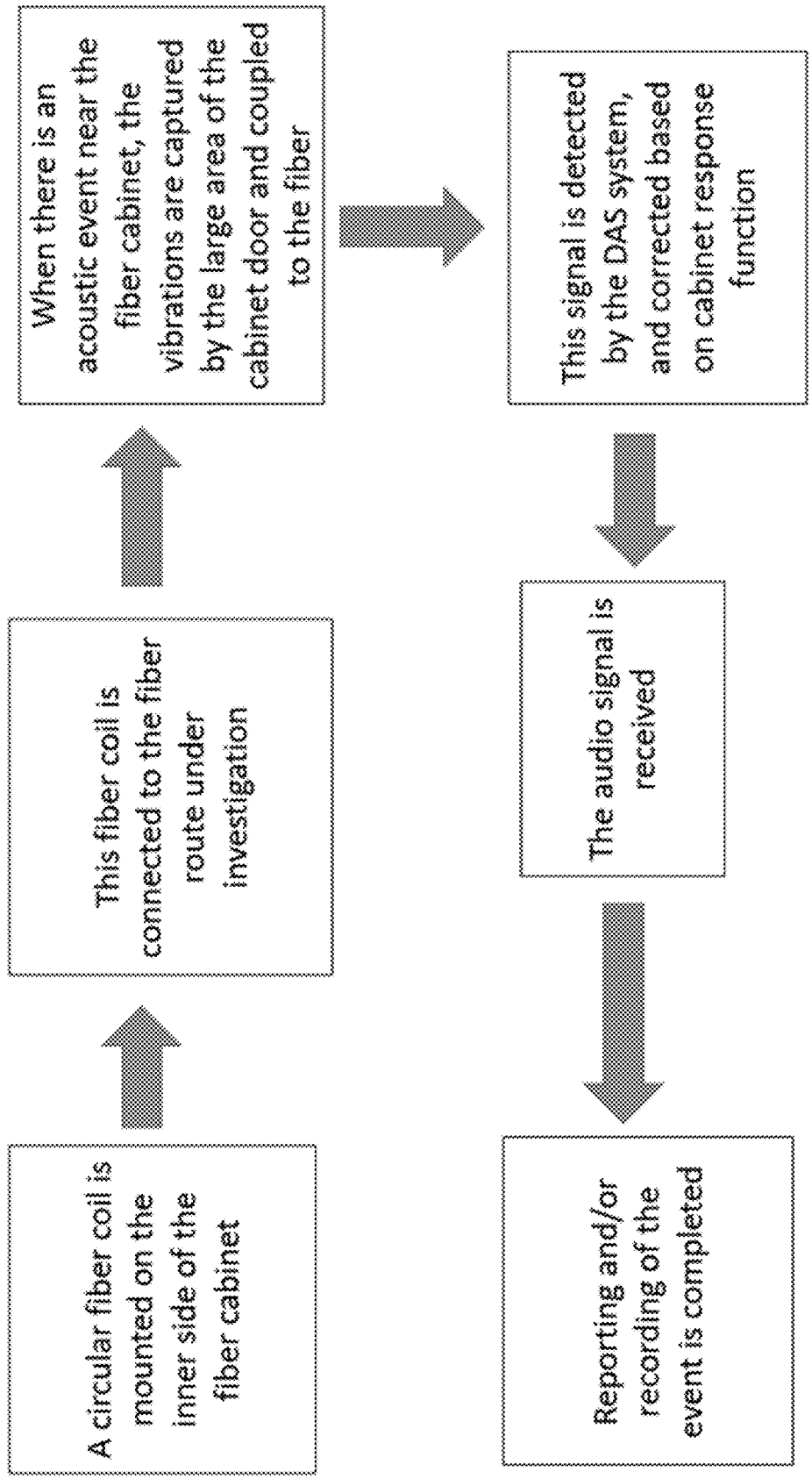
FIG. 3 is a schematic flow diagram illustrating operation of DFOS/DAS sensing of an outdoor fiber optic cabinet including optical sensing fiber according to aspects of the present disclosure.

FIG. 3 is a schematic flow diagram illustrating operation of DFOS/DAS sensing of an outdoor fiber optic cabinet including optical sensing fiber according to aspects of the present disclosure.

As may be observed from that figure, a fiber cabinet—that is a structure containing an optical fiber cable that may be used for telecommunications in addition to sensor functions—includes a length of optical fiber sensor cable that is mounted on an inner side of the fiber cabinet in a circular, coiled arrangement. Such sensor fiber is optically and/or mechanically connected to a fiber route to be investigated/interrogated/analyzed/monitored.

When an acoustic even occurs sufficiently proximate to the cabinet, mechanical vibrations are produced in the fiber cabinet and amplified due to a relatively large area of the cabinet surface (door) and coupled to the sensor fiber contained therein.

Such mechanical disturbances are detected by operation of a DFOS/DAS system and analyzed/corrected according to cabinet response functions that may be advantageously determined in advance.

The analyzed signals are used to generate reports and/or notifications of events of interest.

We now note that currently, there exists no recognized, "good" solution for manhole intrusion detection (and continuous status monitoring). As such, facilities operators may necessarily deploy technicians to manhole field locations periodically. However, such efforts are labor-inefficient and time-consuming.

Accordingly, we continue our disclosure of DFOS systems, methods, and structures that may be advantageously employed to monitor the status of other outdoor communications facilities including manholes. As such we describe a method that detects manhole/handhole intrusion activities by examining patterns of spatial-temporal data collected by distributed fiber optic sensing (DFOS) systems including DFOS/DAS distributed acoustic sensing, and/or DFOS/(DVS) distributed vibration sensor (DVS). Of particular advantage, our disclosed systems and methods may provide automated, real-time manhole/handhole intrusion detection. With this method, the DFOS-based manhole/handhole intrusion detection solution can be implemented.

As we shall show and describe, our inventive DFOS systems and methods employ artificial intelligence (AI) techniques such that an integrated solution for automatic, real-time monitoring of manholes/handholes along an entire fiber optic cable route that may be simultaneously carrying telecommunications traffic along with the fiber sensing signals.

As we shall show further, our inventive DFOS systems and methods advantageously: use DFOS systems to collect field vibration signals around every manhole along a fiber route 24/7; AI engines are employed to automatically identify signatures of manhole/handhole intrusion activities (i.e., open the cover, touching/shaking the cable, tapping the wall, etc.), and respond in real-time; provide risk assessment and activities classifications from the AI engines; and when a high-risk event is detected: provide an alarm pop-up on a graphical user interface (GUE) while optionally waiting for user to confirm; pinpoint the high-risk event on a geographic/graphical information system (GIS); provide alert messages to operators; and log events archival records including time and manhole/handhole ID information.

A major technical challenge associated with systems and methods according to aspects of the present disclosure is to provide a mechanism to distinguish any vibration(s) caused by intrusion events from those caused by normal environmental conditions, i.e., traffic.

As is known, optical cables are oftentimes deployed alongside roadways/highways, pipelines, train tracks, etc. In the case of roadways/highways, such manholes/handholes are usually installed either in the middle of a road or adjacent, i.e., on the sidewalk. As a result, while vehicles use the highway/roadway, the manholes/handholes cover(s) may also vibrate and generate DFOS pattern data similar to other DFOS data generated by unnatural events. Extracting traffic vibration data traces creates additional computation overhead. Accordingly, our inventive systems and method employ a multi-step approach namely: detection is performed by examining intrusion patterns within each manhole region; and confirmation is based on a Signal-to-Noise Ratio (SNR) metric computed from adjacent (i.e., left and right) neighboring regions. Consequently, our inventive systems and methods ensures a high intrusion detection rate and a low false alarm rate, while also avoiding a need to explicitly extracting traffic traces from DFOS data.

Figure 5:
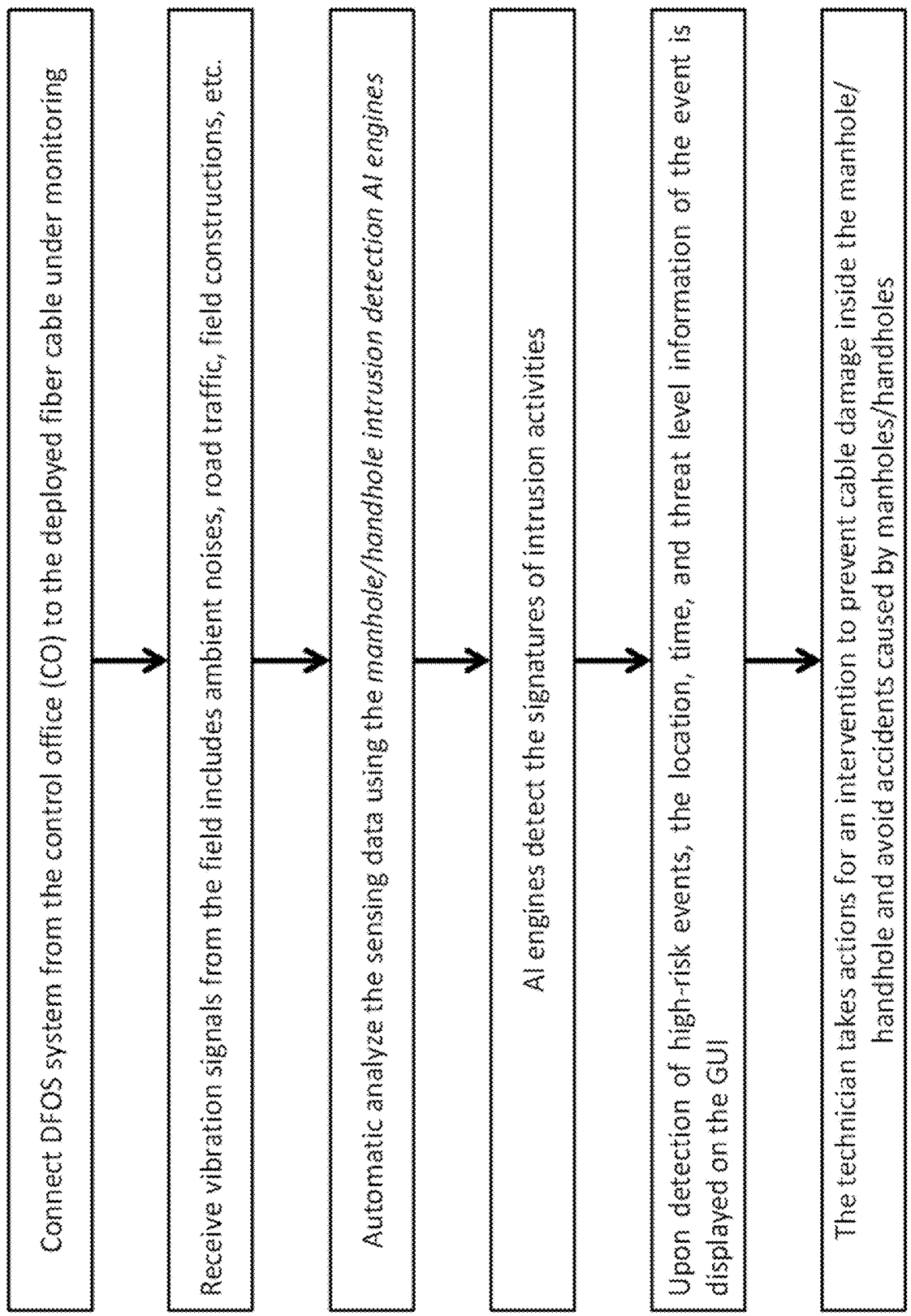
FIG. 5 is a schematic flow diagram showing illustrative procedure for detecting manhole intrusions using DFOS according to aspects of the present disclosure.

FIG. 5 is a schematic flow diagram showing illustrative procedure for detecting manhole intrusions using DFOS according to aspects of the present disclosure. As shown in that flow diagram, a DFOS system is connected to a deployed fiber cable for monitoring. The DFOS system is operated and vibration signals from the field including ambient noise, road traffic, field vibrations, etc., are received. The received signals are automatically analyzed using manhole/handhole/intrusion detection AI engines configured according to aspects of the present disclosure. The AI engines detect signatures of intrusion activities and, upon detection of events determined to be high-risk, the location, time, and threat level information of the event is displayed on a GUI for investigatory/corrective action.

Figure 6:
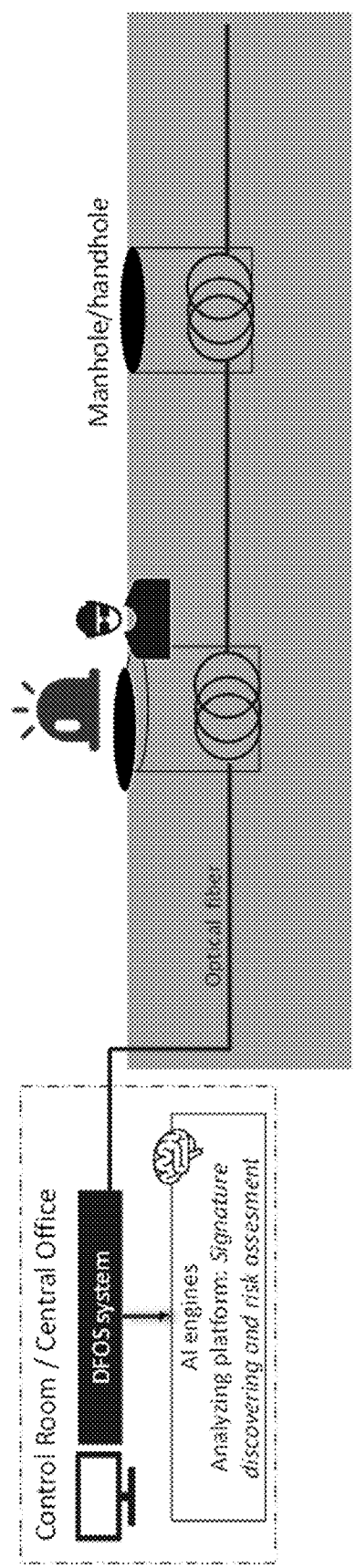
FIG. 6 is a schematic diagram showing illustrative arrangement for detecting manhole intrusions/manhole monitoring using DFOS according to aspects of the present disclosure.

FIG. 6 is a schematic diagram showing illustrative arrangement for detecting manhole intrusions/manhole monitoring using DFOS according to aspects of the present disclosure.

As shown in that figure, the arrangement includes a sensing layer overlaid on existing deployed fiber networks. That is to say, an active telecommunications network may—in addition to carrying live telecommunications traffic—may also provide DFOS sensor signals simultaneously.

In an illustrative arrangement, a DFOS system that may include an interrogator and detection/AI analysis/reporting systems is conveniently located in a the control office/central office for remote monitoring of an entire optical fiber cable route. The DFOS system is connected to the optical fiber such that sensing functions are provided in real time over a long period of time. As noted, the optical fiber used for sensing may be either a "dark" fiber—not carrying telecommunications or optical signals other than the DFOS signals, or operational ("lit") optical fiber carrying live telecommunications traffic that may include service provider traffic.

To train and test AI models, certain intrusion activities were simulated in the field as shown in FIG. 7 which illustrates the activities related to a manhole including those related to the lid/cover, i.e., simulated opening of the lid, closing the lid, lid tapping, case tapping, and pulling cable activities.

From the activities depicted in FIG. 7, it can be observed that different intrusion activities produce different vibration patterns on the sensing data. Among the sensed intrusion activities, cable touching, or shaking are considered as high-risk intrusion events, as it directly interacts with the cable. These activities, upon detection, requires immediate action to be taken, especially if it is unauthorized or unknown to the operator.

Figure 4:
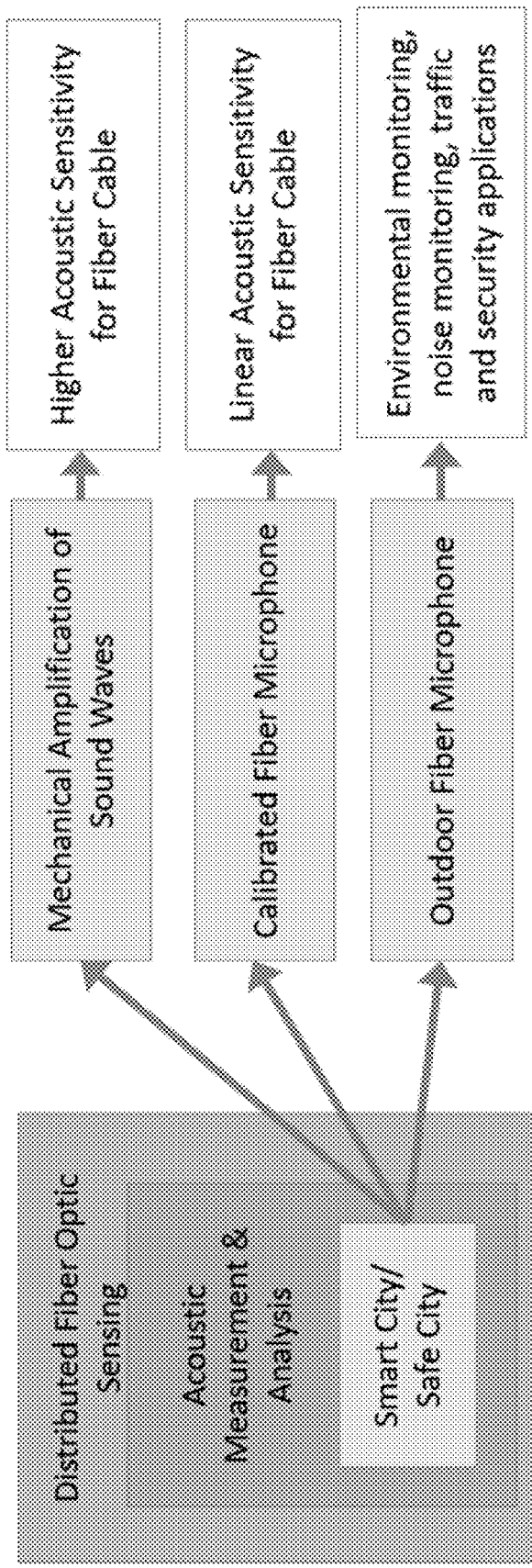
FIG. 4 is a schematic diagram showing illustrative features resulting from our inventive DFOS/DAS/fiber cabinet configuration according to aspects of the present disclosure.
Figure 8:
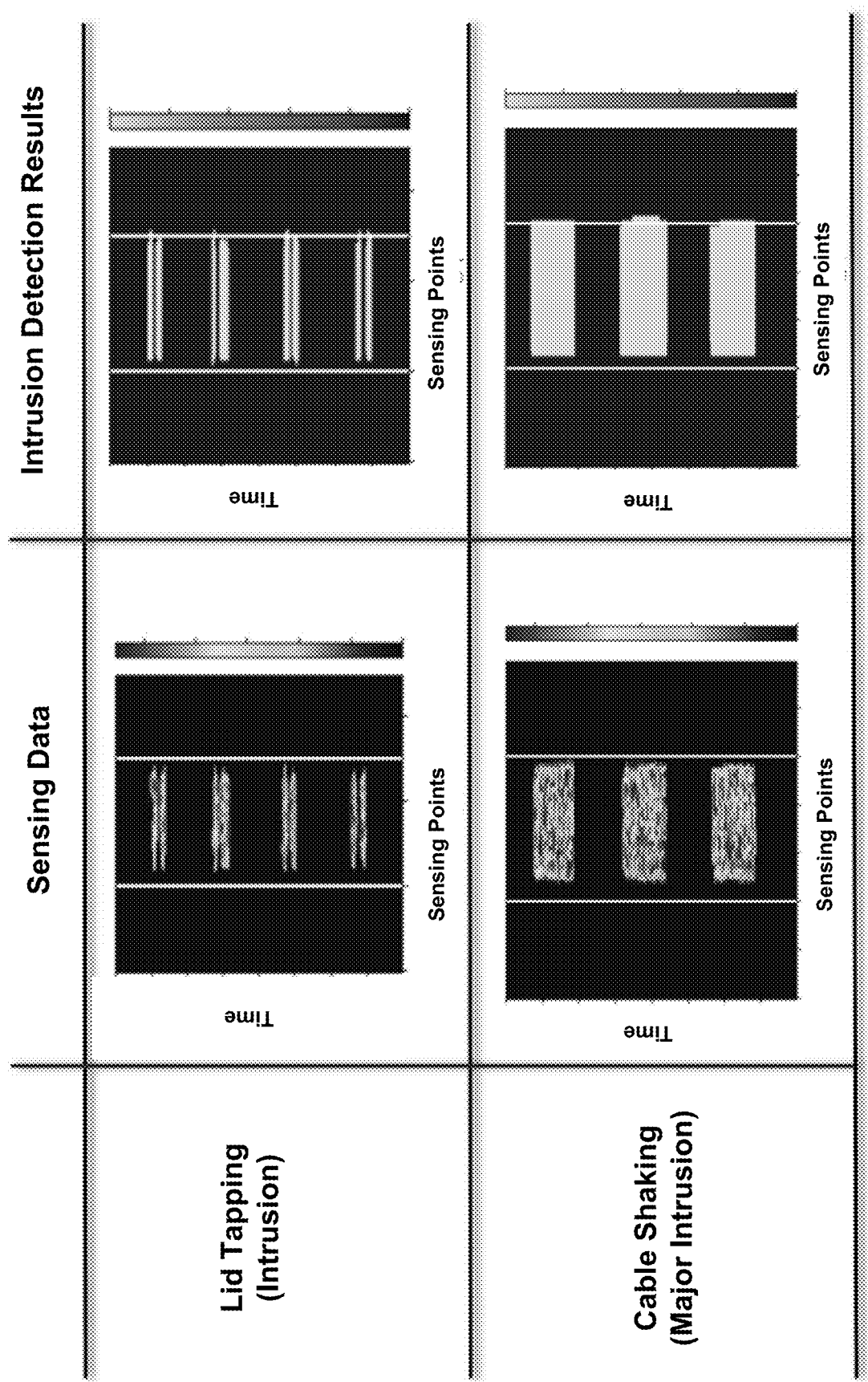
FIG. 8, example intrusion events (e.g., lid tapping) and major intrusion (e.g., cable shaking) are shown in schematic waterfall plots and binary masks according to aspects of the present disclosure.

As will be now understood and appreciated by those skilled in the art, manhole intrusion events can be detected and classified into major intrusion events and intrusion events, utilizing the high dynamic range of the DFOS system. For example, as shown schematically in FIG. 8, example intrusion events (e.g., lid tapping) and major intrusion (e.g., cable shaking) are shown in schematic waterfall plots and binary masks according to aspects of the present disclosure. Major intrusion events require higher level of attention. The temporal and spatial locations of the detected events are indicated by the binary masks. The flowchart of the intrusion detection algorithm is illustrated in FIG. 4, with two major algorithmic modules (detection, and false alarm control) and three possible outcomes (major intrusion, intrusion, and normal). As will be understood and appreciated, the detected Major Intrusion events generally have higher intensities than Intrusion events.

Figure 9:
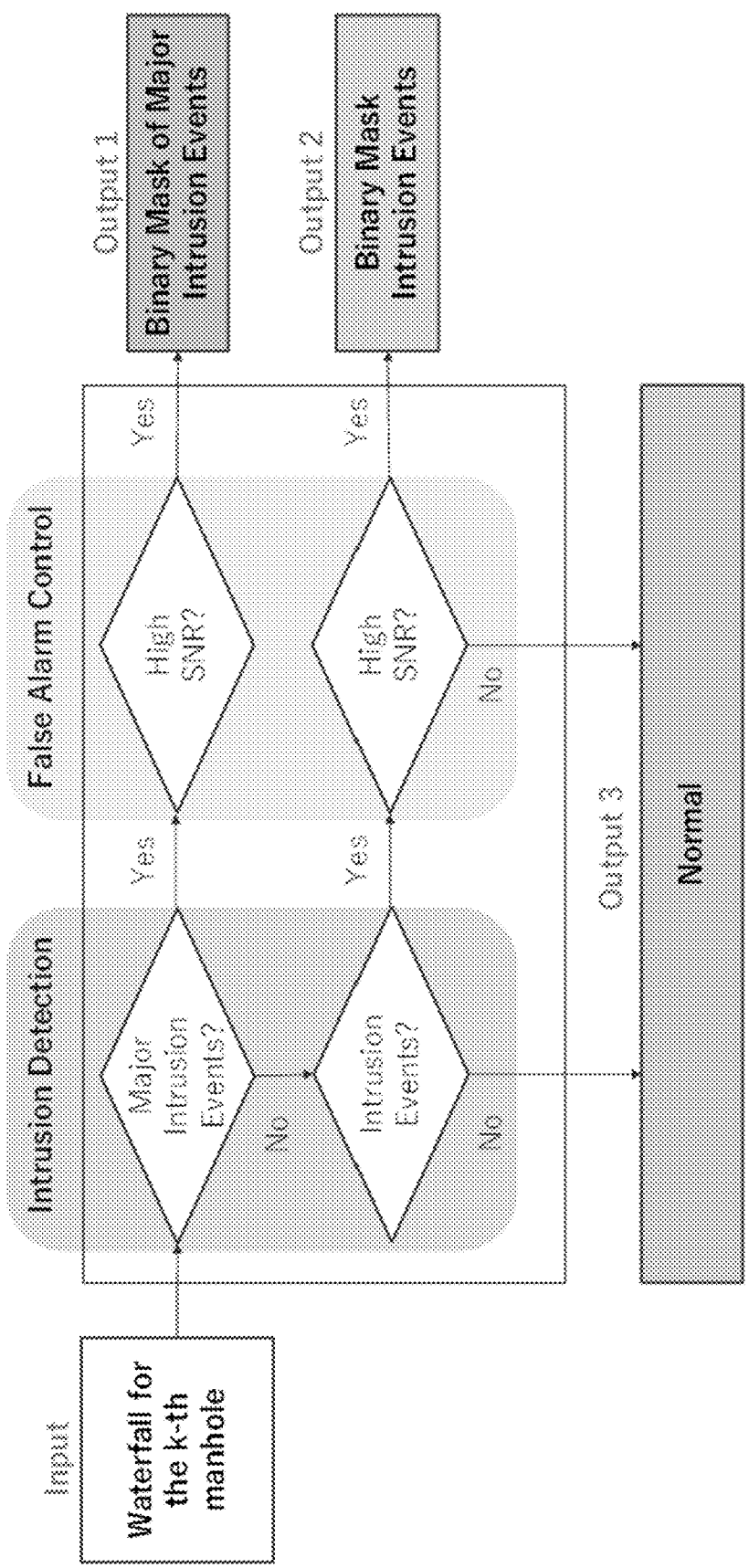
FIG. 9 is a schematic flow diagram showing illustrative intrusion detection for each manhole monitored according to aspects of the present disclosure.
Figure 10:
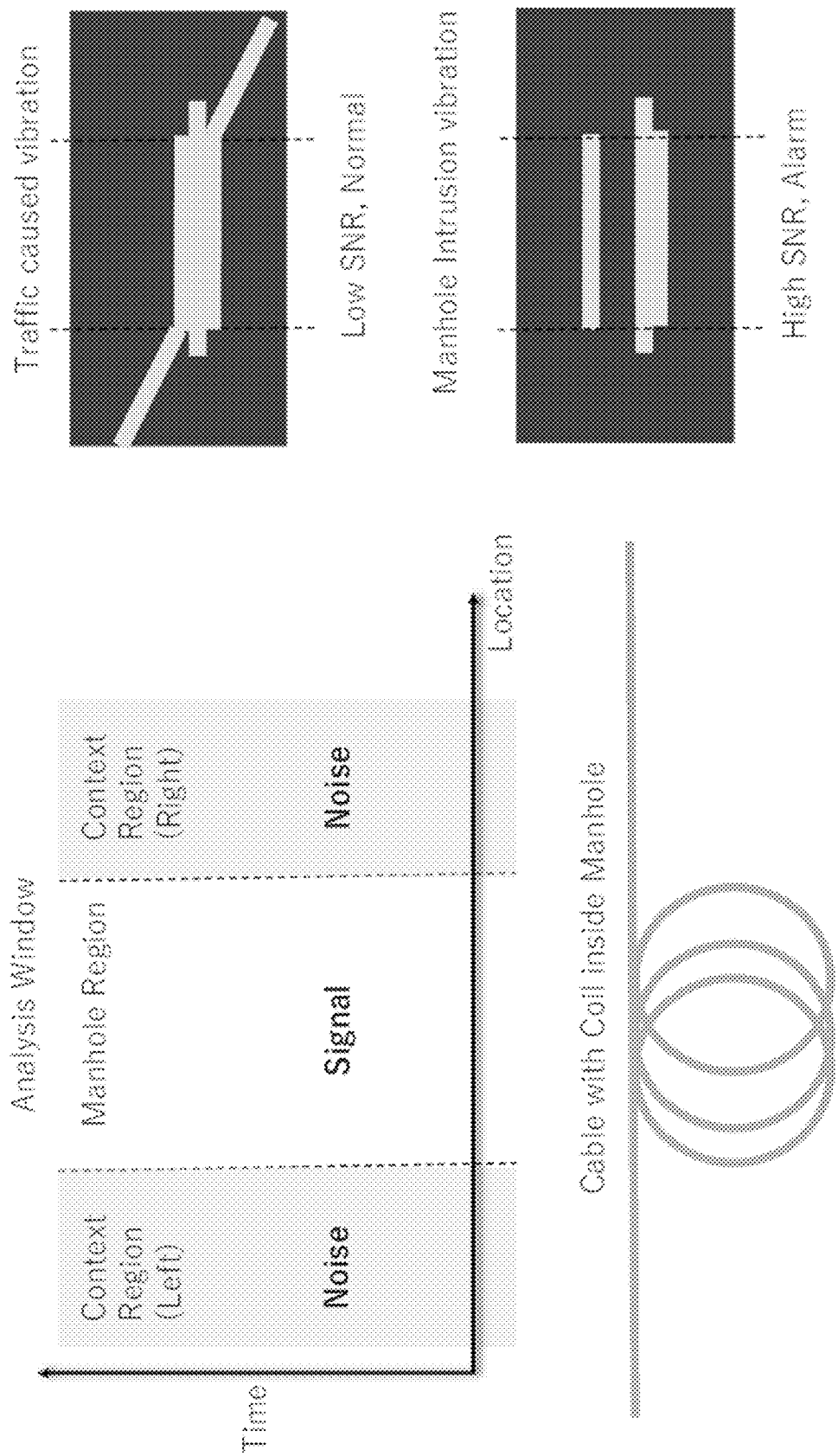
FIG. 10 is a schematic diagram that: illustrates an analysis window, which includes the manhole region in the middle and the two neighboring regions on the left and right wherein the location of manhole along the fiber is pre-known via site survey, using—for example—a lat-long cable mapping solution; and corresponding slack fibers inside the manhole according to aspects of the present disclosure.

FIG. 9 is a schematic flow diagram showing illustrative intrusion detection for each manhole monitored according to aspects of the present disclosure. Operationally, sensing data is analyzed every a few seconds. FIG. 10 is a schematic diagram that: illustrates the analysis window, which includes the manhole region in the middle and the two neighboring regions on the left and right. The location of manhole along the fiber is pre-known via site survey, using—for example—a lat-long cable mapping solution. Shown further in FIG. 10 is corresponding slack fibers inside the manhole. The left and right regions serve as context for understanding the cause of the vibration. When manhole vibration is caused by traffic, the manhole region and context regions will both contain vibration patterns. However, when real manhole intrusion happens, the vibration pattern will be mainly constrained to the manhole region. Based on this observation, we use a SNR-based metric, SNR=Total Intensities in the Manhole Region/Total Intensities in the Context Regions.

In practice, this metric effectively filters out traffic-caused false alarms.

Figure 11:
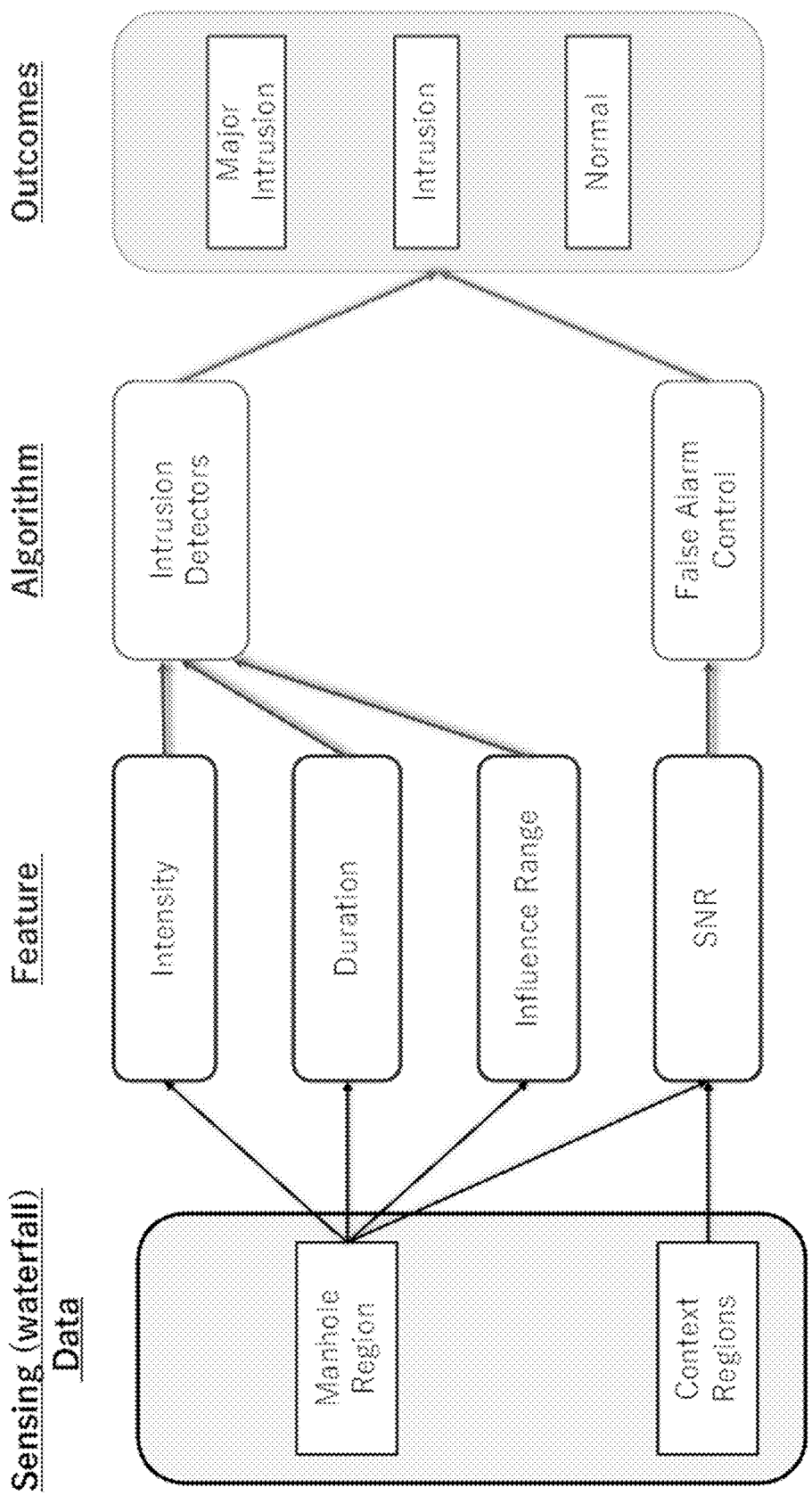
FIG. 11 is a schematic block diagram showing an illustrative data processing pipeline in which arrows indicate input-output dependencies of each module according to aspects of the present disclosure.

FIG. 11 is a schematic block diagram showing an illustrative data processing pipeline in which arrows indicate input-output dependencies of each module according to aspects of the present disclosure.

We note that in evaluating our inventive systems and methods we implemented real-time monitoring of 39 handholes from one route. Intrusion events at individual handhole(s) were successfully detected. We note that that traffic operating over manhole/handhole cover also causes vibrations on a manhole cover and with low-SNR ratio capabilities these events are still classified as normal. Despite the fact that individual handholes had active field constructions nearby, the handhole status are also classified as normal, as they are within the safe range from the manhole. Our DFOS system and processing procedure provide a sufficiently high spatial resolution to distinguish such events that were not differentiable using prior art methods.

Advantageously, our inventive systems and methods may employ user friendly display interfaces that may advantageously include cable route information and detected anomaly signals with risk assessments thereby providing a visualization to operators and telecommunications carriers. Operationally, such GUI may advantageously include: real-time waterfall traces received from the DFOS systems to visualize the field vibration signals; route map(s) which include manhole/handhole locations; and manhole/handhole status. Based on a risk assessment, different levels of risk may be displayed with colors including green, yellow, and orange indicative of normal status, intrusion status and major intrusion status, respectively.

Of further advantage to a GUI presentation, if there are multiple intrusion events including events of different status. Since the status' of a monitored manhole is depicted using progressive colors—green, yellow or orange, which corresponds to normal, intrusion, and major intrusion, respectively, if multiple levels of intrusion are detected for a manhole, the color displayed may be highest level of intrusion. For example, if the detected series of intrusion events include first lid tapping and open, and then cable shaking, and finally lid close. An orange light will overwrite the yellow light to indicate the highest risk so far. A lid close event or normal event afterward will not change the color back to green (normal), unless a user clicks the check button. Meanwhile, upon detection, the checkpoint button design also allow user to confirm whether the detected event has been authorized or known to the user.

Figure 12:
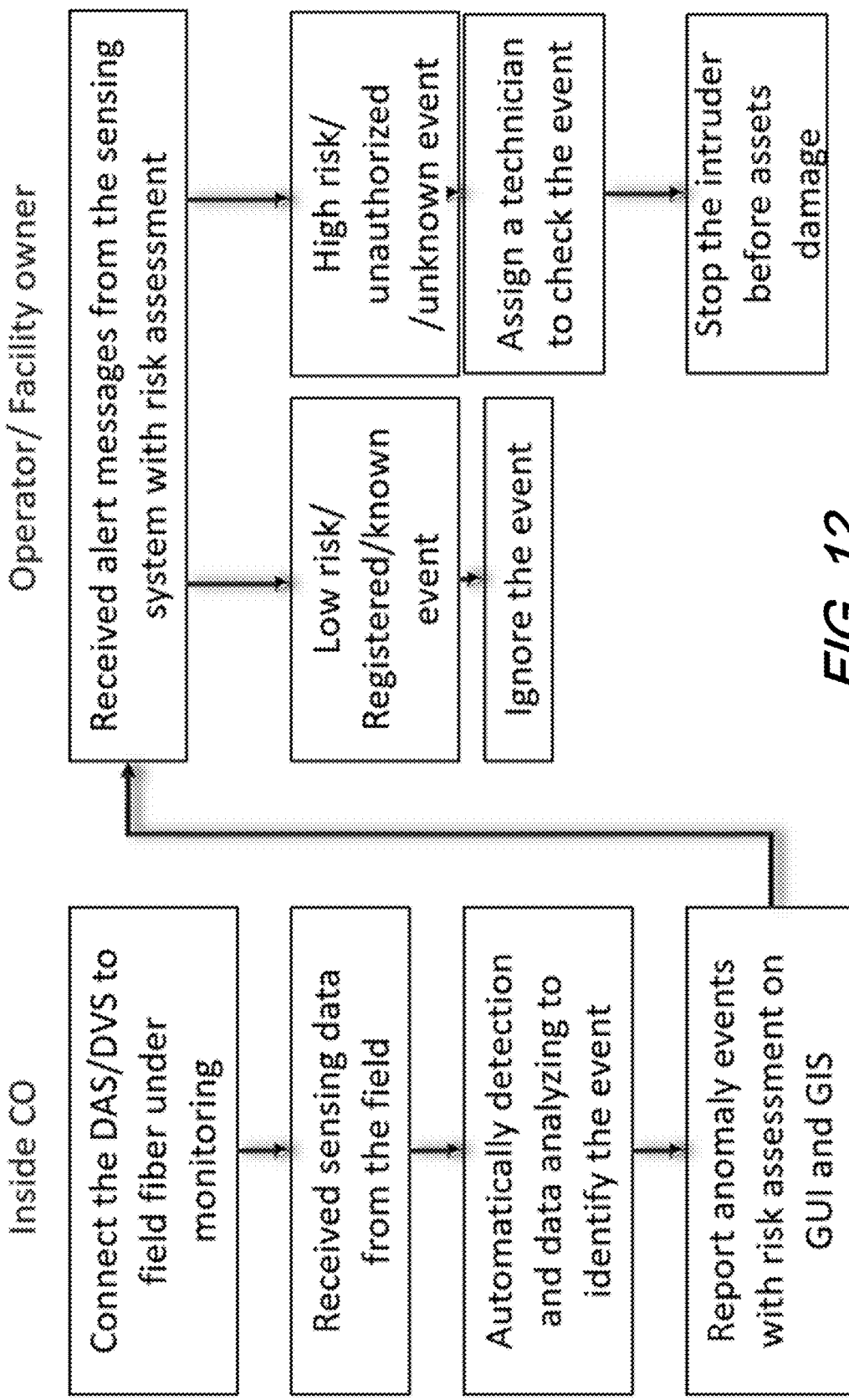
FIG. 12 is a schematic block diagram showing an illustrative, overall manhole intrusion detection process by DFOS systems (DFOS/DAS/DVS) according to aspects of the present disclosure.

FIG. 12 is a schematic block diagram showing an illustrative, overall manhole intrusion detection process by DFOS systems (DFOS/DAS/DVS) according to aspects of the present disclosure.

We now describe in more detail our distributed acoustic sensing (DAS) and machine learning based solution for manhole cover open/close event detection, using pre-deployed optical fiber inside the manhole. In addition, employing a level of automation made possible by our inventive deep learning algorithm, a manhole open/close event can be detected more accurately, and manhole status can be monitored continuously 24/7—as compared with the prior art methods of monitoring. Of further advantage, our inventive methods can monitor hundreds of manholes simultaneously using a single fiber. As is known with DFOS methods, our inventive method does not require electrical power along the fiber sensor route as sensor data is directly transmitted back to an interrogator via light backscattering phenomenon.

Advantageously, without installation of additional trackers/sensors, our inventive systems and methods can detect a vibration signal along an existing optical fiber through DAS. The DAS signal is pre-processed to generate one or more waterfall images that are analyzed by machine learning algorithms in real time. Our deep learning module classifies the event presented in the waterfall image by investigating the intrinsic data structure characterized by transformations and temporal relations. This is achieved by a customized Temporal Relation Network (TRN) module for distributed fiber sensing data, which enables temporal relational reasoning at multiple time scales of waterfall samples in neural networks. Our inventive system and method produces significant improvements over baselines such as conventional CNN-based methods.

In addition to manhole-related event detection, our TRN configuration can also be used in other fiber sensing applications where there exists a temporal relationship in the actions/events and lack of appearance characteristics in data, such as machine moving direction prediction.

As we shall show and describe, our inventive model, once trained on a limited amount of labeled data, can achieve high accuracy on classification of open and close events as compared with prior systems and methods. Advantageously, our systems and methods according to aspects of the present disclosure predict open/close events based on temporal relational reasoning, instead of pattern matching/recognition. As will be appreciated by those skilled in the art, the pattern(s) of two events may be very similar, and as such it is difficult to distinguish them with conventional convolutional neural network (CNN). Therefore, we consider the waterfall image as time series data in y axis, then investigate the relation within the pattern based on the order the event occurs.

To achieve this, we adopt a Temporal Relation Network (TRN) module that enables temporal relational reasoning between different temporal frames of the waterfall sensing data.

Operationally, we view each waterfall image as time series data instead of regular 2D image to explicitly using the temporal information in the data, i.e., considering a waterfall image as a 1D "video". Since the y axis of the image is time, it is naturally a form of (multivariate) time series data. This enables us to adopt several techniques such as video analysis techniques. This includes using data sampled from a combination of time points as model input. Thus, many combinations of the rows can be generated without overlapping, which alleviates the data insufficiency issue and benefits the model training process. Meanwhile, it can accommodate the fluctuations of sensing rates in different DAS sensor, and the different durations of the time course of event.

Another technique that may be employed includes exploring the temporal relation between the features of different frames. In our case the relation between the features of multiple rows (time stamps) is analyzed. We adopt TRN module that captures temporal relationships between multiple ordered rows. This module can be also applied in other event detection problem based on waterfall images, providing improvement in accuracy.

Instead of using raw pixels in waterfall images as feature, we apply convolutional neural networks as encoder to extract features within each row of waterfall data. Considering sensing data at each time point as 1D image, we construct an encoder with 1D rather than 2D convolutional layers. Different manholes may generate vibration patterns of different widths, due to the amount of slack fiber inside. Accordingly, we pad each row with zeros in order to obtain input that has equal length. Without performing image transformation, this preserves the underlying event structure.

Figure 13:
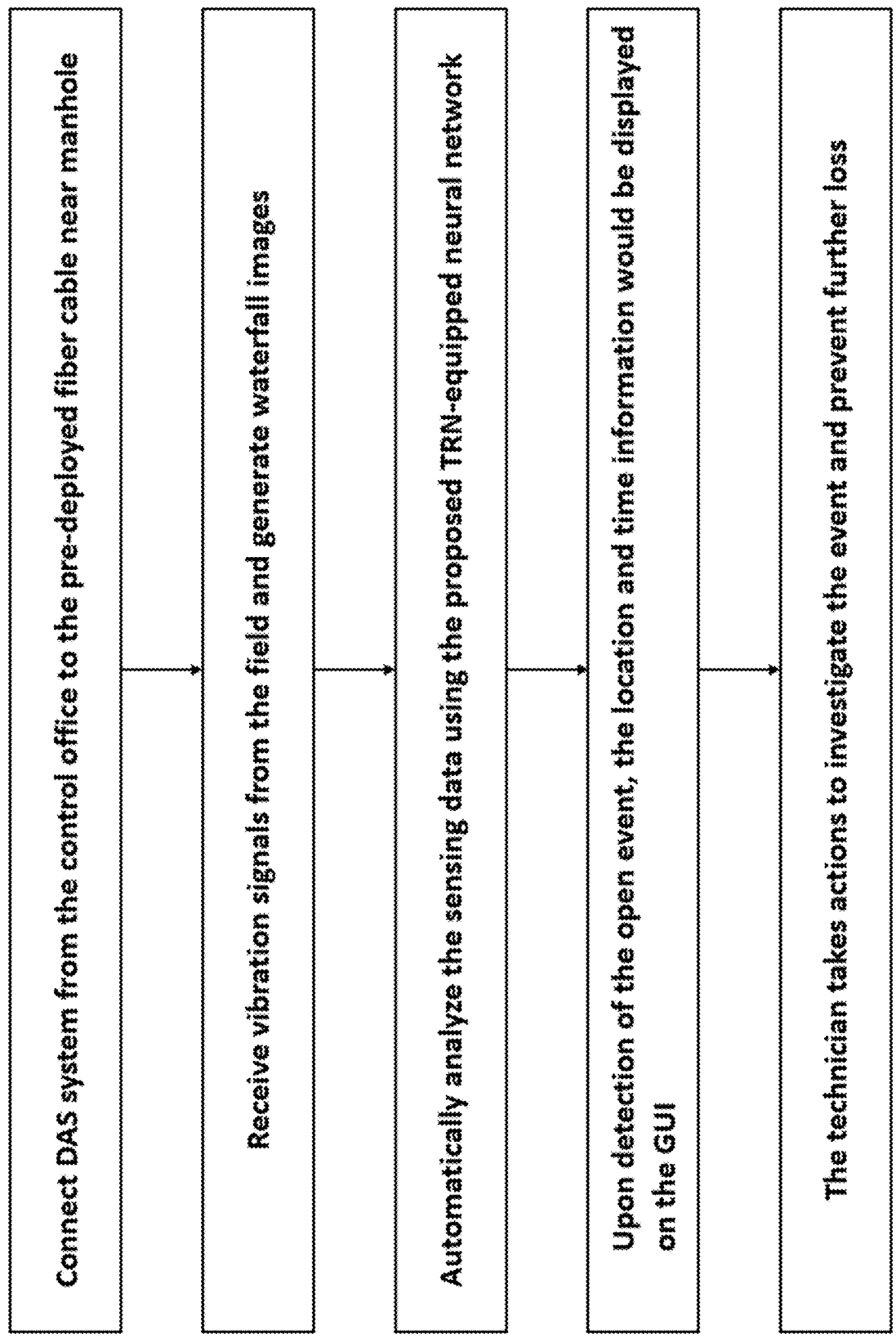
FIG. 13 is a schematic flow diagram showing an illustrative, overall manhole intrusion detection process by DFOS systems (DFOS/DAS/DVS) according to aspects of the present disclosure.

FIG. 13 is a schematic flow diagram showing an illustrative, overall manhole intrusion detection process by DFOS systems (DFOS/DAS/DVS) according to aspects of the present disclosure.

Figure 14:
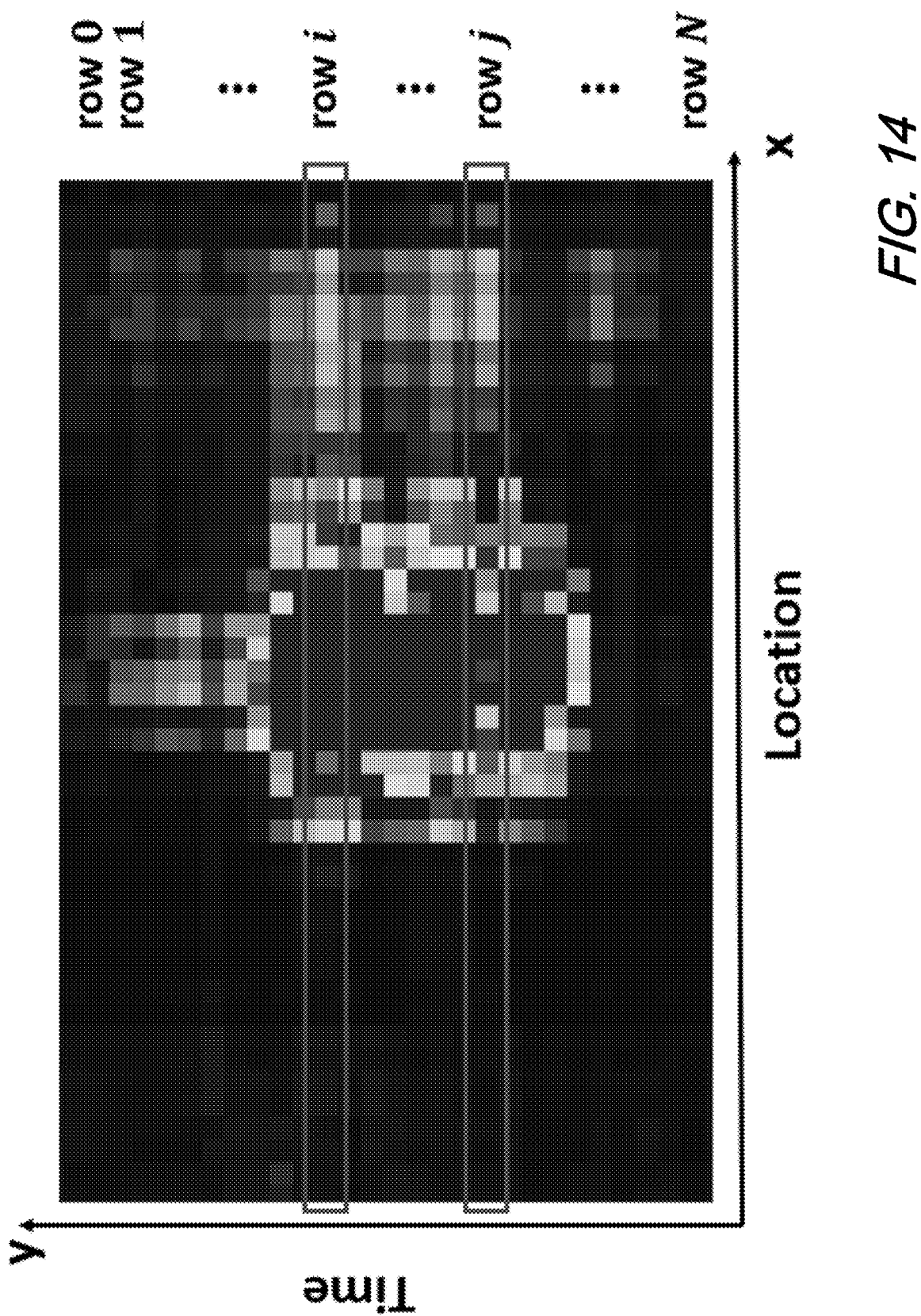
FIG. 14 is a schematic diagram showing an illustrative generated waterfall image according to aspects of the present disclosure.

FIG. 14 is a schematic diagram showing an illustrative generated waterfall image according to aspects of the present disclosure.

Note that as the open/close event is a continuous action, it is natural to investigate the underlying correlation between different time stamp, which is encoded in the rows in the waterfall image as shown in FIG. 14. Assume the time window is N, i.e., there are N rows in the image. As the event is on-going from row j to row i, the corresponding vibration pattern changes in the same order. For example, if the event is "open", there might be some vibration patterns corresponding to lifting the manhole, then following the patterns that represent the cover touching the ground. The inherent relation within an action also exists in the "close" event (aligning the manhole cover before putting it down). To model the temporal relations between observations in waterfall image, we adopt TRN module. A pairwise temporal relation can be defined as $$T_2(I) = h_\phi(\Sigma_{i<j} g_\theta(f_i, f_j)), \quad (1)$$

where the input is the waterfall image I with n selected ordered rows as I={$f_1, f_2, \ldots, f_n$}, where $f_i$ is a representation of the $i^{th}$ row of the image. The function $h_\phi$ and $g_\theta$ fuse features of different ordered rows. We use multilayer perceptrons (MLP) with parameters $\phi$ and $\theta$ respectively. The definition can be further extended to higher row relations such as 3-row relation function $$T_3(I) = h'_\phi(\Sigma_{i<j<k} g'_\theta(f_i, f_j, f_k)). \quad (2)$$

When events are completed and cannot be captured by single scale relations, we can use the following function to accumulate relations at different scales $$MT_L(I) = T_2(I) + T_3(I) \ldots T_L(I), \quad (3)$$

Where $T_d$ captures temporal relationships between d ordered rows. All the relation functions are end-to-end trainable with base CNN.

Figure 15:
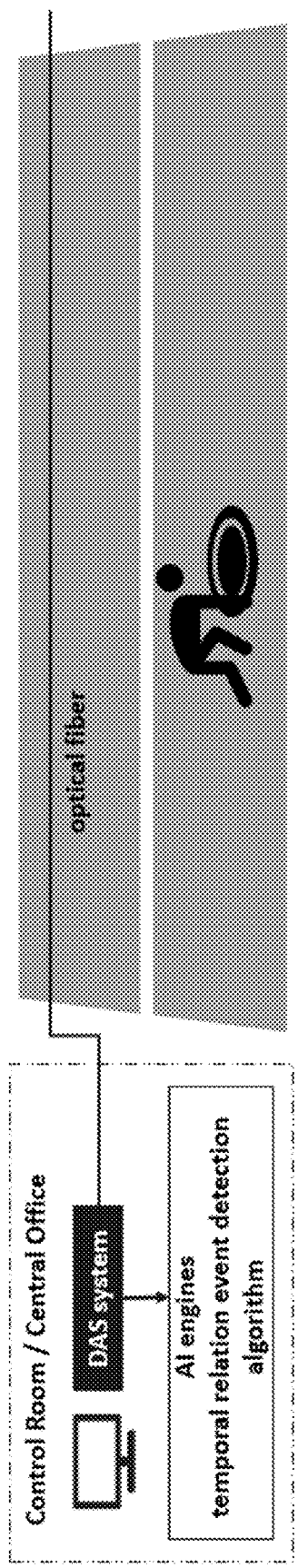
FIG. 15 is a schematic diagram showing shows the configuration of the manhole open/close event detection system according to aspects of the present disclosure.

FIG. 15 is a schematic diagram showing shows the configuration of the manhole open/close event detection system and the sample waterfall data for manhole cover open, close, or normal background. The Distributed Acoustic Sensor (DAS) is connected to existing deployed fiber networks to monitor the vibration along it. It is located in the control room/central office, with the AI engines based on our temporal relation event detection algorithm. The system is able to continuously sense and analyze related events in real-time.

We note that it can be seen in waterfall data that the shape and intensity of the vibration patterns from different manholes are quite different, due to different cover shape, weight, and ground surface type. Meanwhile, the open and close events look similar, and the time course of events are different, due to the behavior of different operators. The intra-class heterogeneity and inter-class similarity characterize the main technical challenge of machine learning. Conventional CNN based model can effectively detect manhole intrusion events from background, however, it could not distinguish open from close. In practice, accurately detecting the manhole open event is a key feature for anti-theft of manhole cover.

Figure 16:
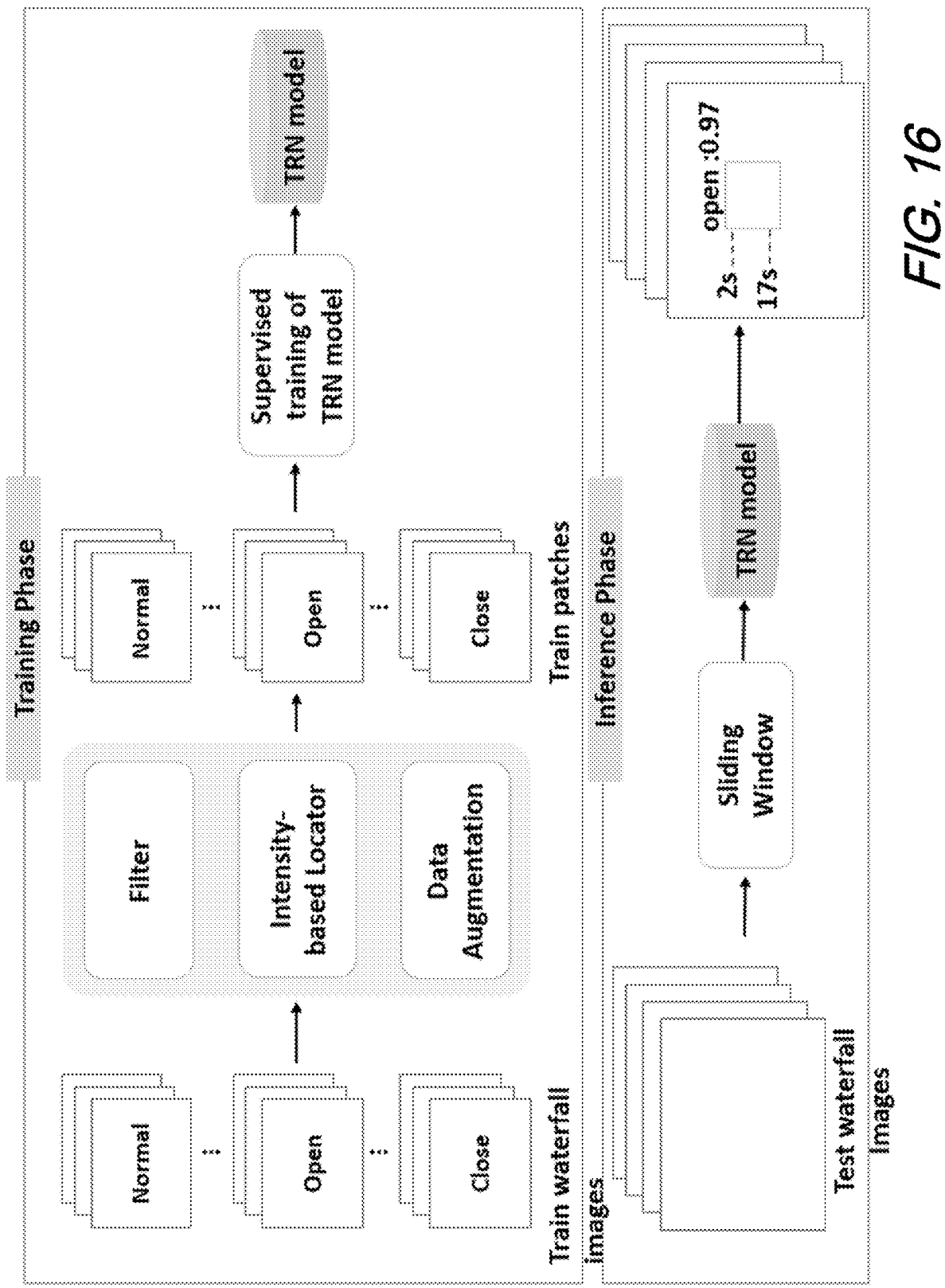
FIG. 16 shows the flow chart of the overall processing procedure including training and inference phase according to aspects of the present disclosure.

FIG. 16 shows the flow chart of the overall processing procedure including training and inference phase according to aspects of the present disclosure. During the training phase, the first step is to obtain training patches with certain spatial and temporal resolution. To do so, we apply a filter to smooth the signal and select the candidate high vibration patch based on the intensity. Then transform the selected patch with random perturbation in location and pixel space. Following conventional supervised training procedure, the TRN model is trained with label and patch pairs.

Figure 17:
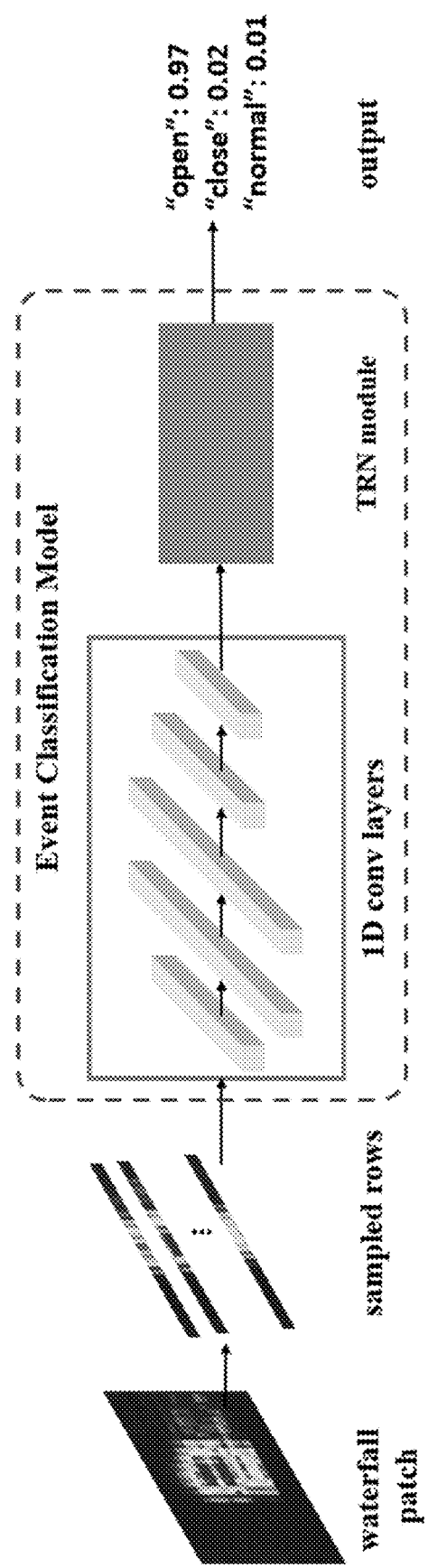
FIG. 17 shows the overall architecture of the TRN-equipped fiber sensing event classification model according to aspects of the present disclosure.
Figure 18:
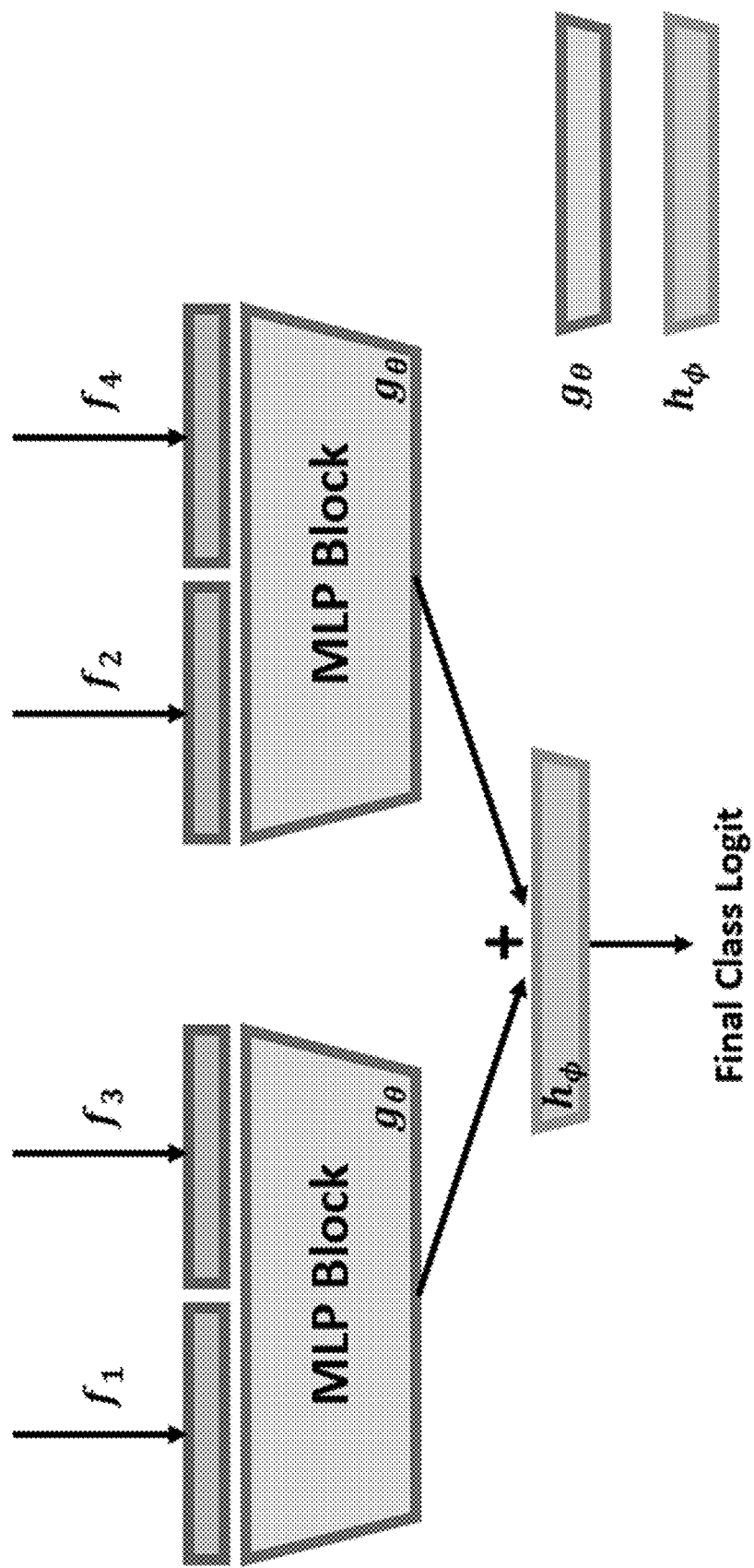
FIG. 18 is a schematic diagram illustrating details of a 2-frame temporal relation module. $f_i$ represents the feature from previous convolutional layer block according to aspects of the present disclosure.

In the inference phase, the input waterfall images are converted into local patches with overlaps by sliding window. The patches are then classified by the trained TRN model to determine if an open or close event exists within the patch. The AI engine takes continuous streams of input data and runs inference in real-time on GPU, providing timestamps, event types, and confidence scores as the output FIG. 17 shows the overall architecture of the TRN-equipped fiber sensing event classification model according to aspects of the present disclosure. For each input of waterfall patch, we randomly sample rows as the event signal happens in y axis. The number of rows is a hyper-parameter in the model. The classification model is composed of 1d convolutional layers and TRN module. The convolutional layers are used to extract features of each row along x axis. These features may encode the characteristics corresponding to the intensity along the x axis. While the following TRN module is capable to transform and consider the row features together and in order. The generated features from TRN module can describe the progress of the event in temporal dimension. The output of the TRN module is the probability of the input being each category and the final prediction is the one with the highest value. The entire model is trained with regular cross entropy loss by stochastic gradient descent (SGD) optimizer FIG. 18 is a schematic diagram illustrating details of a 2-frame temporal relation module. $f_i$ represents the feature from previous convolutional layer block according to aspects of the present disclosure. For $g_\theta$, we adopt a MLP block composed of two fully connected layers. The first layer has 512 units following a ReLU activation function for non-linearity. The number of the units of the second layer matches the class number. For $h_\phi$, we simply use identity function. For more complicated event presenting in images, one may replace $h_\phi$ with MLP block for better representation ability, combining with multi-scale implemented by adding up the following block using equation (3).

When training a multi-scale temporal network, we adopt cascaded sampling strategy for better efficiency: (1) sample N rows uniformly from the N segments along the y axis. (2) for each d<N, we choose k random subsamples of d frames to calculate the d-frame relations. This allows kN temporal relations using only N frames. As the N is different for each epoch, the model learns to recognize the event by the row combination from the N uniform segments. This largely accelerates training procedure comparing to using the entire image.

As will be understood and appreciated by those skilled in the art, our inventive disclosure provide a solution to detect manhole open/close event in real time with pre-deployed optical cable. The usage of fiber sensing technology empowered by our AI deep learning-based algorithm provides a complete solution without installing additional sensors. However, due to the similar appearance presented in the produced waterfall image of two events, this task is challenging using conventional convolutional neural networks. Instead, we take advantage of inherent characteristics along temporal dimension as an event continues, which is invariant of external factors. This is achieved by employing a temporal relation after a 1-d convolutional layer. The design of the convolutional layer block is 1-d since the input is 1d (a row instead of 2d image). The end-to-end trainable model takes selected representative rows as input, and outputs the prediction by choosing the category with the highest probability. By enabling temporal relational reasoning in fiber sensing data, fine-grained event recognition such as manhole cover open/close based on DAS fiber sensing is supported for the first time.

Figure 19:
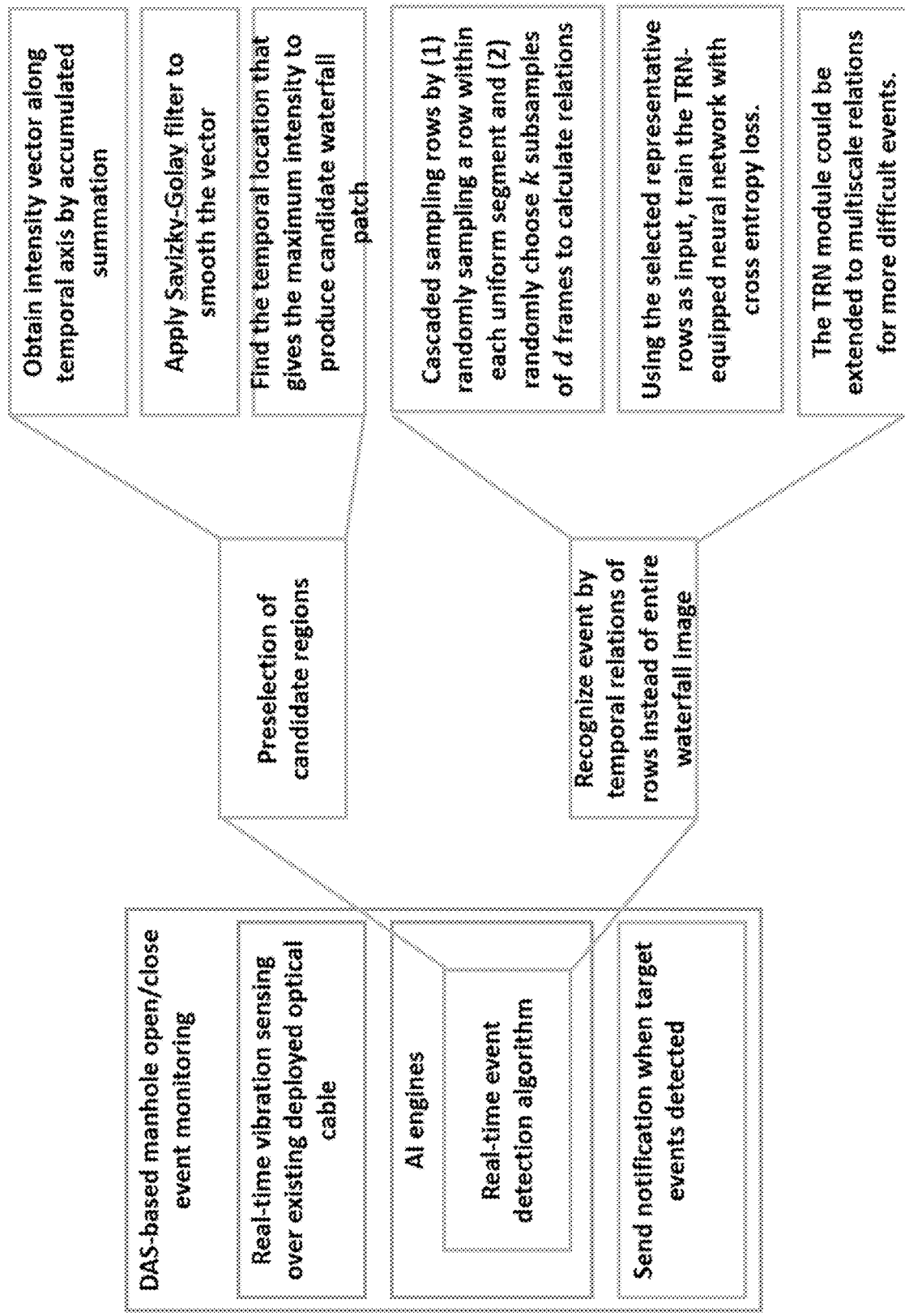
FIG. 19 is a schematic block diagram illustrating features of our inventive manhole detection according to aspects of the present disclosure.

FIG. 19 is a schematic block diagram illustrating features of our inventive manhole detection according to aspects of the present disclosure.

At this point, while we have presented this disclosure using some specific examples, those skilled in the art will recognize that our teachings are not so limited. Accordingly, this disclosure should only be limited by the scope of the claims attached hereto.

The invention claimed is:

1. A distributed fiber optic sensing (DFOS) system comprising:
   a length of optical fiber sensor cable;
   a DFOS interrogator system in optical communication with the length of optical fiber sensor cable;
   an intelligent analyzer configured to analyze DFOS sensing data received by the DFOS interrogator system;
   the distributed fiber optic sensing (DFOS) system CHARACTERIZED BY
      an outdoor fiber cabinet in positioned in an optical path of the length of optical fiber sensor cable, the outdoor fiber cabinet configured to amplify acoustic vibration waves and mechanically convey the acoustic vibration waves to the optical fiber sensor cable such that acoustic vibration signals are detected by the intelligent analyzer;
   wherein at least a portion of the outdoor fiber cabinet is configured as a fiber microphone/amplifier and includes a fiber coil formed from the optical fiber sensor cable;
   wherein the fiber coil formed from the optical fiber sensor cable is mechanically mounted to the portion of the outdoor fiber cabinet configured as a fiber microphone/amplifier;
   wherein the portion of the outdoor fiber cabinet configured as a fiber microphone/amplifier includes an interaction area that interacts with acoustic vibration waves; and
   wherein the outdoor fiber cabinet configured as a fiber microphone/amplifier is a door.

2. The system of claim 1 wherein the intelligent analyzer is configured to detect whether the door is open or closed.

3. The system of claim 2 wherein the intelligent analyzer is configured to detect whether an open/closed status of the door is authorized.

4. The system of claim 3 wherein the portion of the outdoor fiber cabinet configured as a fiber microphone/amplifier is constructed from a metal.

5. The system of claim 4 wherein the optical fiber sensor cable carries telecommunications traffic simultaneously with any DFOS signals.

6. A distributed fiber optic sensing (DFOS)/distributed acoustic sensing (DAS) system comprising:
   a length of optical fiber sensor cable;
   a DFOS/DAS interrogator system in optical communication with the length of optical fiber sensor cable; and
   an AI-intelligent analyzer including a temporal relation neural network (TRN) configured to provide temporal relation event detection in DFOS sensing data received by the DFOS interrogator system.

7. The system of claim 6 further comprising one or more manholes in which at least a portion of the length of optical fiber sensor cable resides.

8. The system of claim 7 wherein the TRN is trained to obtain training patches having desired spatial and temporal resolution.

9. The system of claim 8 where the TRN training includes a filter to smooth signals and select a candidate high vibration patch based on intensity.

10. The system of claim 9 wherein a TRN model is trained with label and patch pairs.

11. The system of claim 10 wherein TRN model determines if an open or close event exists within a patch and an AI engine receives as input continuous streams of input data and performs inference in real-time, providing timestamps, event types, and confidence scores as output.

* * * * *